June 22, 1965 D. E. GRISWOLD 3,190,446
AUTOMATIC CONTROL MEANS FOR A WATER SOFTENER SYSTEM
Filed Oct. 28, 1960 4 Sheets-Sheet 4

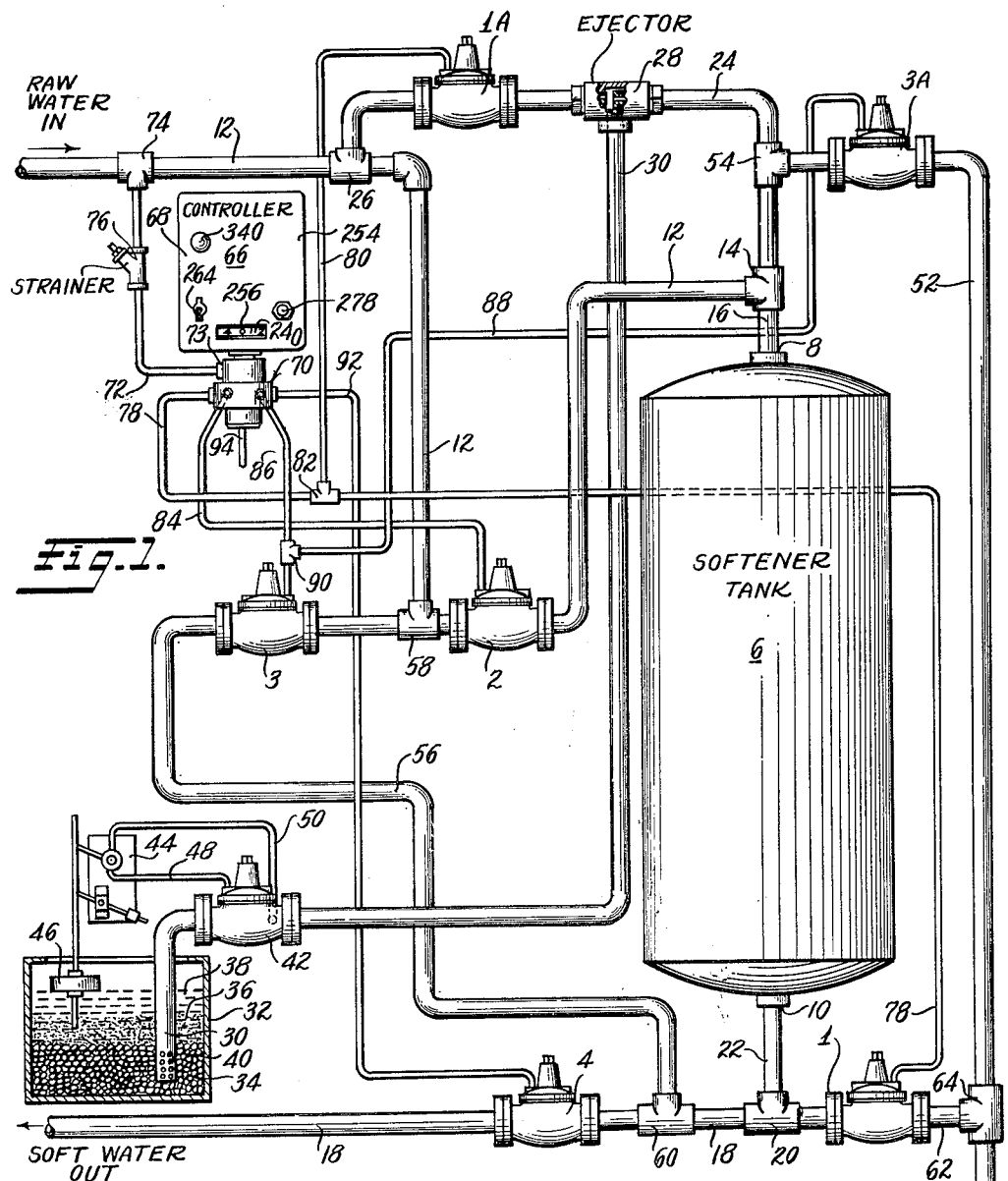

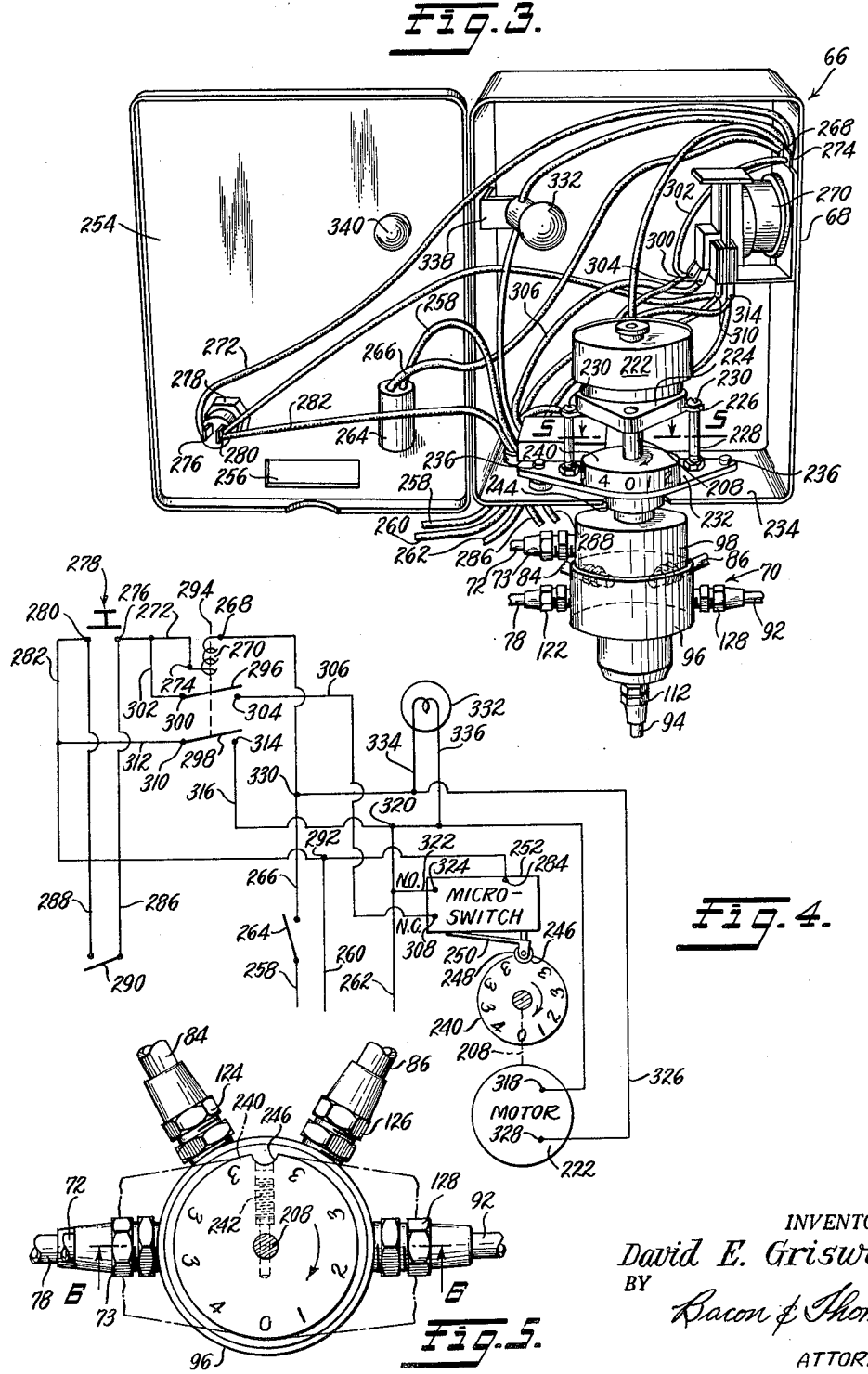

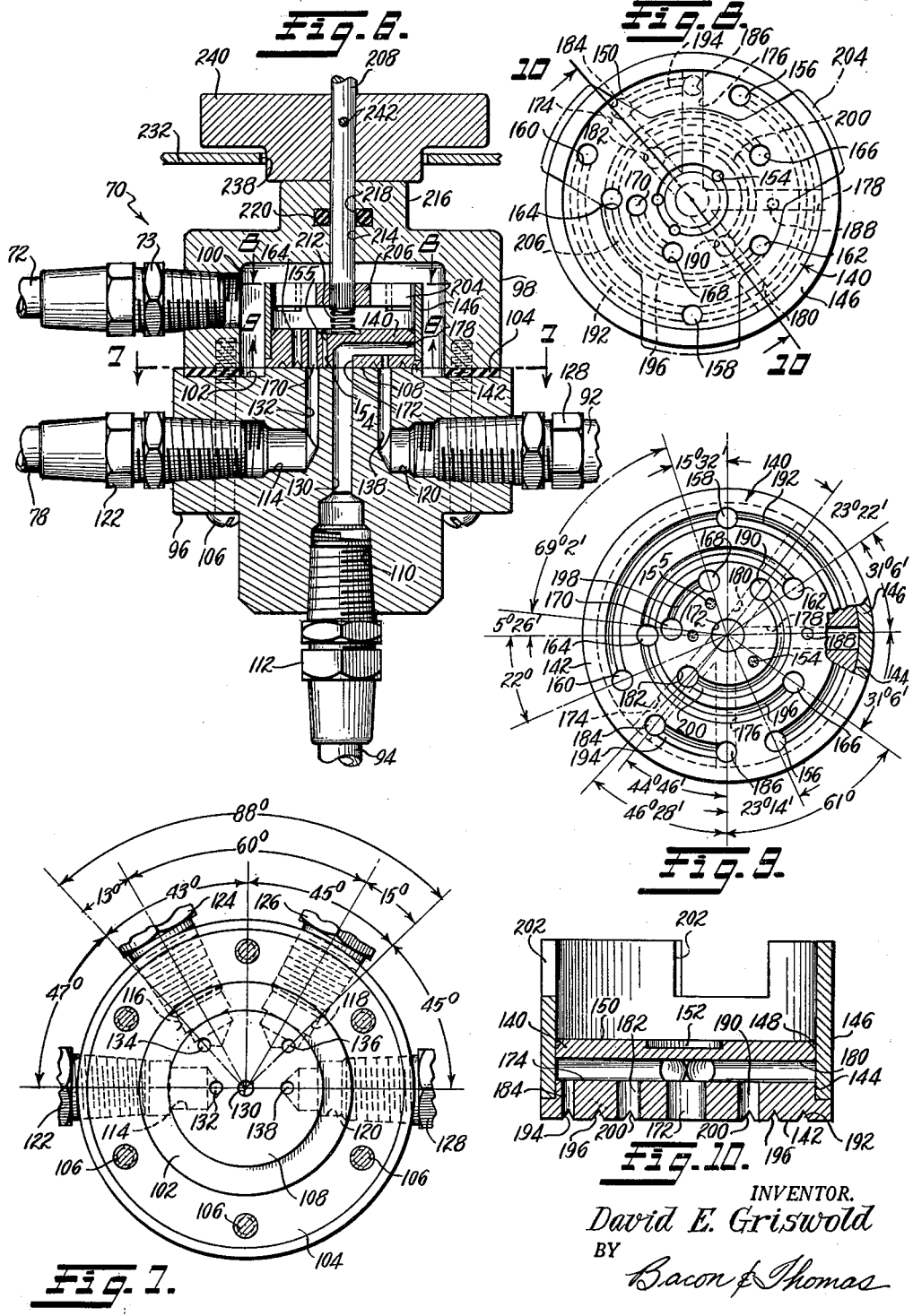

PILOT DISC IN "SERVICE" POSITION NO. 0

PILOT DISC IN "OFF" POSITION NO. 1

PILOT DISC IN "BACKWASH" POSITION NO. 2

PILOT DISC IN "BRINE AND SLOW RINSE" POSITIONS NOS. 3

PILOT DISC IN "FAST RINSE" POSITION NO. 4

INVENTOR.
David E. Griswold
BY
Bacon & Thomas
ATTORNEYS

United States Patent Office 3,190,446
Patented June 22, 1965

3,190,446
AUTOMATIC CONTROL MEANS FOR A WATER SOFTENER SYSTEM
David E. Griswold, Newport Beach, Calif., assignor to Donald G. Griswold, Newport Beach, Calif.
Filed Oct. 28, 1960, Ser. No. 65,731
13 Claims. (Cl. 210—126)

The present invention relates to an automatic control system for use with apparatus requiring sequential actuation of a series of valves for effecting a cycle of operation, and more particualrly, to a method of regenerating a water softener bed of zeolite or similar material, to a controller for a water softening system having a series of hydraulically operated flow control valves connected therewith, and to an electrically operated pilot valve controlling the supply of operating fluid to said valves.

The present controller includes an electrically driven cycle timing device, which controls a pilot valve to effect opening and closing of the aforesaid series of hydraulically operated valves in proper, timed, sequence to effect the following cycle of operation:

(1) Cutting off service flow;
(2) Effecting reverse flow or backwashing through the water softener tank;
(3) Regenerating the softener bed in the water softener tank, followed by a slow rinsing of the water softener tank;
(4) Effecting a fast rinse of the water softener tank; and
(5) Restoration of service flow.

The present controller also includes a control box having a pushbutton mounted thereon that can be manually actuated to start the cycle timer from the control box, and a remote control switch that can be actuated to start the cycle timer from a remote point. Actuation of either of the pushbutton, or the remotely located switch, will start the timing device connected with the pilot valve for rotating a pilot disk within the pilot valve at a uniform speed. The pilot valve is designed so that it completes a cycle of backwashing and rinsing in a single revolution of its disk, and within a predetermined time interval.

Accordingly, the principal object of the invention is to provide control means for an apparatus requiring sequential operation of a set of valves, and wherein the control means can be actuated from either a proximate or remote point to initiate a cycle of operation of the valves.

Another object is to provide a novel system of regenerating the softener bed of a water softener device.

Another object is to provide a pilot valve that will automatically effect the cycle of operation described above.

Still another object is to provide a rotary pilot valve that is simple in construction, easy to manufacture, and offers a minimum of resistance to rotation.

A further object is to provide a rotary pilot valve having a disk and a seat with ports arranged on concentric circles, so that a single disk can perform the function of a plurality of rotary valves having a single circle of passages.

A still further object is to provide a rotary pilot valve in which operating fluid can be continuously delivered through a controlled passage in the valve without requiring a port extending through the pilot disk to be directly in registry with the controlled passage.

A more specific object is to provide a softener for treating water or some other liquid, and control means for the softener that will enable an operator to recondition the softener, at will.

Other features and further objects of the invention will be apparent from the following description taken in conjunction with the accompanying drawings, in which:

FIG. 1 is a diagrammatic view of a water softened system according to the invention having the present automatic control system connected therewith;

FIG. 2 is a sequence diagram of the cycle of operation of the water softener system of FIG. 1, indicating the various steps in the cycle of operation, and the various valves which are closed or open during the different stages of the cycle;

FIG. 3 is a perspective view of the controller box or housing as seen with its cover in wide-open position, revealing the pilot valve, motor, relay, and wiring comprising the component parts of the electrically operated portion of the control system for the softener;

FIG. 4 is a schematic wiring diagram of the electrical control system;

FIG. 5 is a fragmentary horizontal sectional view taken on the line 5—5 of FIG. 3, particularly showing the tube connections for operating fluid extending from the pilot valve, and a pilot valve position indicating cam for actuating a microswitch in the electrical control circuit;

FIG. 6 is an enlarged vertical sectional view of the pilot valve, taken on the line 6—6 of FIG. 5;

FIG. 7 is a plan view of the pilot disk seat on the fluid distributing base of the pilot valve, as viewed on the line 7—7 of FIG. 6;

FIG. 8 is an enlarged plan view of the rotary pilot disk, showing a driving element therefor in dot-and-dash lines, as viewed on the line 8—8 of FIG. 6;

FIG. 9 is a bottom plan view of the pilot disk as viewed on the line 9—9 of FIG. 6, a portion of the disk being shown in cross-section;

Figure 11:
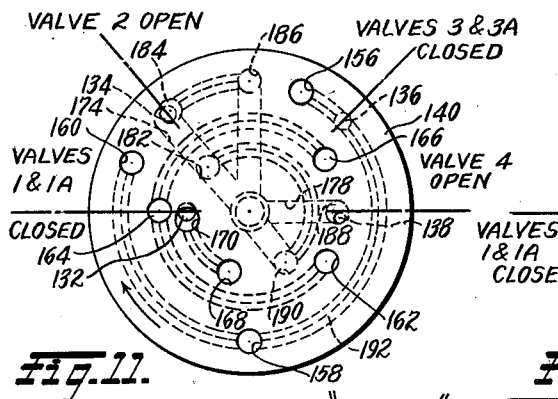
Figure 12:
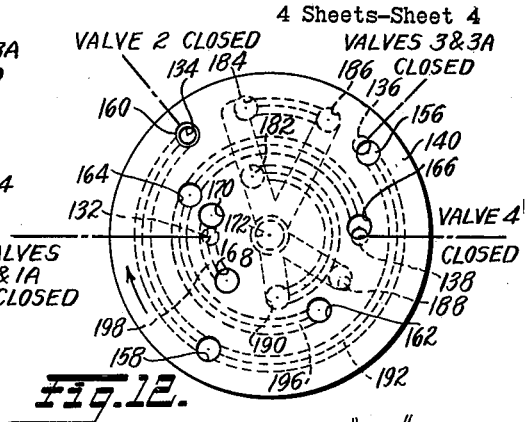

FIG. 10 is a vertical sectional view through the pilot disk, taken on the line 10—10 of FIG. 8; and FIGS. 11–15, inclusive, are diagrammatic views showing the relative position of the ports of the pilot disk and seat corresponding to the pilot positions numbered 0, 1, 2, 3 and 4, respectively, on the cam shown in FIG. 5, and corresponding to the opened or closed condition of the flow control valves for the same numbered positions noted in the diagram of FIG. 2.

In order to illustrate an operative embodiment of the present control system, the same has been illustrated, and will be described herein, in connection with a water softener system employing a bed of zeolite or similar material in a water treating tank through which untreated water flows to remove the calcium and magnesium salts that impart hardness thereto.

In the normal operation of sodium zeolite water softeners, after a definite amount of raw water has passed through the bed, the sodium of the bed becomes replaced by calcium and magnesium to such an extent that the bed loses its softening property, and the water passing therethrough is not softened thereby. Consequently, at certain time intervals, depending upon the nature and quantity of water treated, it becomes necessary to recondition or regenerate the zeolite bed. In other words, it becomes necessary to replace the calcium and magnesium, which the bed has absorbed from the raw water, by sodium. This is done by passing a strong brine (sodium chloride) solution through the bed. A reverse action then take place in the bed, viz., the calcium and magnesium in the zeolite are exchanged for sodium and the bed is restored to its normal base condition.

Referring to the drawings, FIG. 1 diagrammatically illustrates the present control system associated with a conventional "Zeolite" water softener tank 6 adapted to treat hard water. The softener tank 6 has an inlet 8 at its upper end and an outlet 10 at its lower end. A supply conduit 12, leading from a source of raw water to be treated, is connected with the inlet 8 by a pipe-T 14 and a pipe nipple 16. A discharge or service conduit 18, for conducting treated or soft water from the tank 6 to a point of use, is connected with the outlet 10 by way of pipe-T 20 and a pipe nipple 22.

A by-pass conduit 24 is connected with the supply conduit 12 by a pipe-T 26, at one end, and is connected at the other end to the pipe-T 14. It will be seen, therefore, that this arrangement provides a pair of parallel paths from the source of raw water to the inlet 8 of the water softener tank 6. The flow of raw water through the by-pass conduit 24 is under the control of a fluid pressure actuated valve 1A, which is connected in the conduit 24 at a point near the pipe-T 26. A conventional ejector 28 is interposed in the conduit 24 adjacent the valve 1A and upstream of the inlet 8.

The ejector 28 is connected with one end of a brine supply conduit 30, the other end of the conduit extending into a brine tank 32. The brine tank 32 contains, in the bottom thereof, a layer of coarse gravel 34 supporting a bed of salt 36. A predetermined quantity of water 38 covers the salt bed 36 and the gravel 34. The lower end of the brine supply conduit 30 extends to a point within the coarse gravel 34 slightly above the bottom of the tank 32, the inlet end of the conduit having a plurality of perforations 40 communicating with the zone occupied by the coarse gravel.

The flow of brine through the conduit 30 is controlled by a fluid pressure actuated valve 42 under the control of a pilot valve 44. Pilot valve 44 is operated by a float 46 within the tank 32, movable in accordance with the liquid level therein. A conduit 48 connects the pilot valve with a pressure chamber in the valve 42, and a conduit 50 provides a connection between the pilot valve and the side of the valve 42 connected with the conduit 30, which serves as a source of pressure fluid for operation of the valve 42. The details of this valve and its operation are similar to that disclosed in Patent No. 2,243,815, issued May 27, 1941, to Donald G. Griswold, to which reference is made for a further disclosure.

The supply conduit 12 has a fluid pressure actuated supply valve 2 connected therein for controlling the flow of raw water to the tank inlet 8. A service valve 4 is connected in the service conduit 18 for controlling the flow of soft water through said conduit. A waste conduit 52 is connected at one end with the water softener tank inlet 8 through a pipe-T 54 disposed in the by-pass conduit 24. A waste valve 3A, similar to the valves 2 and 4, is connected in the waste conduit 52 to control the flow of water from the softener tank 6 to a point of waste, as will be explained more fully hereinafter.

A backwash conduit 56 is connected at one end with the supply conduit 12 by a pipe-T 58, and at its other end is connected with the outlet 10 by way of a pipe-T 60 in the service conduit 18. A backwash valve 3 is connected in the conduit 56 to control the flow of water into the lower end of the softener tank 6 to effect backwashing, as will be described hereinafter. A drain conduit 62 is connected at one end with the pipe-T 20, and is connected at its opposite end with the waste conduit 52 by a pipe-T 64 located downstream from the waste valve 3A. A drain valve 1, similar to the valves 2, 3 and 4, is connected in the drain conduit 62 between the pipe-T 20 and the pipe-T 64. The valve 1 controls the flow of rinse water from the softener tank 6 to the waste conduit 52 during a softener tank rinsing operation, as will be described later.

The valves 1, 1A, 2, 3, 3A and 4 are subject to the exclusive control of a controller generally identified by the numeral 66. The controller 66 includes a housing 68 which serves as a mounting for a pilot valve 70 located exteriorly thereof. Operating fluid under pressure is supplied to the pilot valve 70 through a tube 72, which is connected at one end by a pipe-T 74 with the supply conduit 12, and is connected at its other end by a fitting 73 with the pilot valve 70. A conventional strainer 76 is connected to the tube 72, between the pipe-T and the pilot valve 70.

Operating fluid under pressure is distributed by the pilot valve 70 through tube 78 to the drain valve 1; tube 78, pipe-T 82 and branch tube 80 to the by-pass valve 1A; tube 84 to the supply valve 2; tube 86 to the backwash valve 3; tube 86, pipe-T 90 and branch tube 88 to the waste valve 3A; and tube 92 to the service flow control valve 4. An exhaust tube 94 is connected with the pilot valve 70 for disposing of spent operating fluid.

The pilot valve 70 is shown in detail in FIGS. 6, 7, 8, 9 and 10, and includes a housing having a fluid distribution base 96 and an overlying cover 98. The cover 98 is hollow and provides a pressure chamber 100 to which operating fluid under pressure is supplied through the tube 72 and fitting 73.

The upper surface of the base 96 has an annular recess 102, which is occupied, in part, by a gasket 104, disposed between the upper surface of the base 96 and the lower surface of the cover 98. A series of screws 106 passes through aligned openings in the base 96 and gasket 104, and into threaded holes in the cover 98 to retain the cover, gasket and base in assembled relation. The annular recess 106 surrounds an elevated circular seat 108.

The lower end of the base 96 has an axial drain passage 110 which is enlarged and threaded at its outer end to receive a fitting 112 that connects the drain tube 94 with the pilot valve. The base 96 also includes four radial bores 114, 116, 118 and 120 (FIG. 7), disposed in the same plane, each with its axis disposed on an angle of 60° relative to an adjacent bore. These bores are enlarged and threaded at their outer end to receive fittings 122, 124, 126 and 128, respectively, and connect the conduits 78, 84, 86 and 92, respectively, in fluid communication with the pilot valve base 96 (see FIG. 5).

The drain passage 110 (FIG. 6) has a portion 130 of reduced diameter that extends to the center of the valve seat 108. The base 96 also has axially extending passages 132, 134, 136 and 138 (FIG. 7), which communicate at one end with the radial bores 114, 116, 118 and 120, respectively, and open as ports at their upper ends in the surface of the valve seat 108. It should be noted, with reference to FIG. 7, that the passage 132 lies on an inner circle having its center at the axis of the drain port 130, that the passage 138 lies on an intermediate concentric circle having a greater radius, and that the passages 134 and 136 lie on an outer concentric circle having a still greater radius.

It should also be noted that while the passages 132 and 138 coincide with the axis of the bores 114 and 120, respectively, the passages 134 and 136 are offset relative to the bores 116 and 118, respectively, to give the desired timing of the valves. As will be seen in FIG. 7, the axis of the passage 134 subtends an angle of 47° with the axis of the passage 132, or an angle of 13° relative to the axis of the bore 116. The axis of the passage 136 subtends an angle of 45° with the axis of the passage 138, and an angle of 15° with the axis of the bore 118. The axes of the passages 134 and 136 are separated by an angle of 88°. This spacing is important in the operation of the pilot valve to properly time the various operations, as will be set forth more fully hereinafter. A rotary pilot disk 140, FIG. 6, is disposed in the pressure chamber 100 to cooperate with the ports or passages 130, 132, 134, 136 and 138 in the base 96 to control the flow of operating fluid in both directions through the several pressure tubes connected with the base and the valves 1, 1A, 2, 3, 3A and 4.

The pilot disk 140, FIGS. 6, 8, 9 and 10, has a lower surface 142 in rotatable, sliding contact with the seat 108. The surface 142 of the pilot disk 140 and the surface of the valve seat 108 are lapped to provide a fluid-tight contact. The disk 140 has a peripheral channel 144 (FIG. 10) to receive one end of a sleeve 146, the disk and sleeve being joined by soldering at 148. An upper surface 150 of the disk 140 is provided with a central recess 152, and a series of lubricating passages 154 extend through the disk and contain lubricating material 155. The disk 140 also includes a series of ports 156, 158, 160, 162, 164, 166, 168 and 170, arranged on circles concentric with the axis of the disk. As seen in FIGS. 8 and 9, the ports 156, 158 and 160 are arranged on an outer circle, the ports 162, 164 and 166 are arranged on an intermediate concentric circle, and the ports 168 and 170 are arranged on an inner concentric circle.

The lower surface 142 of the disk 140 has an axial port 172 extending inwardly therefrom and partially through the disk, the inner end of the port being connected with four radial drain passages 174, 176, 178 and 180. The outer ends of these radial passages are blocked by the lower portion of the sleeve 146, as is clearly seen in FIGS. 6, 9 and 10, to prevent communication between the pressure chamber 100 and the drain passage 130. A pair of radially offset vertical ports 182 and 184 connect the radial passage 174 with the lower surface 142 of the disk, and similar vertical ports 186, 188 and 190 connect the radial passages 176, 178 and 180, respectively, with the surface 142. The radial passages 174, 176, 178 and 180, in cooperation with the vertical ports 182, 184, 186, 188 and 190, and the central axial port 172, form a series of generally U-shaped drain or exhaust passages communicating at one end with the common drain passage 130 in the base, and communicating through said vertical ports with the valve seat 108 on one of the circles formed by the concentric rings of ports 156, 158, 160, 162, 164, 166, 168, and 170. Specifically, the ports 182 and 184 adjacent the outer end of the radial passage 174 lie on circles having the same diameters as those occupied by the ports 170 and 160, respectively (FIGS. 8 and 9). Similarly the port 186, adjacent the outer end of the radial passage 176, lies on the outer circle, the port 188 adjacent the outer end of the radial passage 178 lies on the intermediate circle, and the port 190 adjacent the outer end of the radial passage 180 lies on the innermost circle.

Referring to FIG. 9, it will be observed that the vertical port 188 is slightly offset relative to the axis of the radial passage 178, that the ports 188 and 162 subtend an angle of 31° 6'; the ports 188 and 156 subtend an angle of 31° 6'; the ports 162 and 166 subtend an angle of 62° 12'; the ports 166 and 186 subtend an angle of 61°; the ports 156 and 186 subtend an angle of 23° 14'; the ports 184 and 186 subtend an angle of 44° 46'; the ports 182 and 186 subtend an angle of 46° 28'; the ports 160 and 164 substend an angle of 22°; the ports 164 and 170 subtend an angle of 5° 26'; the ports 158 and 168 subtend an angle of 15° 32'; and the ports 162 and 190 subtend an angle of 23° 22'. This spacing is important in the particular embodiment disclosed in order to give the operation desired.

It should be noted that the radius of the circle occupied by the ports 156, 158, 160, 184 and 186 on the outer circle is the same as the radius of the circle occupied by the passages or seat ports 134 and 136 in the base; that the radius of the circle occupied by the ports 162, 164, 166 and 188 is the same as the radius of the circle occupied by the passage of seat port 138 in the base; and that the radius of the circle occupied by the ports 168, 170, 182 and 190 is the same as the radius of the circle occupied by the passage or seat port 132 in the base.

Referring to FIGS. 9 and 10, a first arcuate channel 192 of V-shaped cross section is formed in the lower surface 142 of the disk 140 and interconnects the ports 156, 158 and 160; a second arcuate channel 194, also of V-shaped cross section, is formed in the lower surface 142, and interconnects the ports 184 and 186; a third arcuate channel 196 of similar cross section, formed in the lower surface 142, interconnects the ports 162, 164 and 166; a fourth arcuate channel 198 of similar cross section, formed in the lower surface 142, interconnects the ports 168 and 170; and a fifth arcuate channel 200, of similar cross section, formed in the lower surface 142, interconnects the ports 182 and 190.

From an inspection of FIG. 9, it will be noted that the first arcuate channel 192 extends through an arc of approximately 270°; that the second arcuate channel 194 extends through an angle of approximately 45°; that the third arcuate channel 194 extends through an angle of aproximately 45; that the third arcuate channel 196 extends through an angle of approximately 300°; that the fourth arcuate channel 198 extends through an angle of approximately 69°2'; and that the fifth arcuate channel 200 extends through an angle of approximately 180°.

The upper end of the sleeve 146 on the pilot disk 140 has three equally spaced, axially extending slots 202, adapted to receive radial arms 204 of a driving member 206, shown in dot-and-dash lines in FIG. 8 and in solid lines in FIG. 6. The driving member 206 is pressed onto a splined portion at the lower end of a pilot valve drive shaft 208. A spring 212 is interposed between the lower end of the pilot valve drive shaft 208 and the recess 152 in the upper surface 150 of the pilot disk 140 to resiliently urge the lower face 142 of the pilot disk against the seat 108. The shaft 208 extends through a bearing 214 in an upper wall of the cover 98 (FIG. 6). The upper wall carries a boss 216 having an internal recess 218 containing an O-ring 220 forming a seal with the shaft 208 for preventing loss of operating fluid from the chamber 100 through the bore occupied by the shaft 208. The shaft 208 is driven by an electric motor 222 (FIG. 3) through a conventional reduction gearing and a conventional one-way clutch (not shown) enclosed in a housing 224. The housing 224 has a series of spaced lugs 226 which engage spacing sleeves 228 and are secured by bolts 230, extending through said sleeves, to a mounting plate 232. The mounting plate 232 is secured to a bottom wall 234 of the housing 68 by fasteners 236. The upper end of the shaft 208 is attached to the driven member of the one-way clutch, for a purpose to be explained hereinafter. The mounting plate 232 is provided with an aperture 238 (FIG. 6), through which the shaft 208 and the hub of a cam 240 pass. The cam 240 is secured against rotation relative to the shaft 208 by a pin 242. The bottom wall 234 of the housing 68 includes a slot 244 for the reception of the hub of the cam 240, as shown in FIG. 3.

The periphery of the cam 240 has a notch or dwell 246, (FIGS. 4 and 5), adapted to cooperate with a roller 248 carried by an arm 250 of a microswitch 252. The outer periphery of the cam 240 is provided with a series of uniformly spaced numerals 0, 1, 2, 3, 3, 3, 3, 3 and 4. A door 254 is hingedly mounted on the housing 68 and has a slot 256 near its lower edge. When the door 254 is closed, as shown in FIG. 1, a portion of the cam 240 projects outwardly through the slot 256. The slot 256 is sufficiently long so that at least one of the numerals on its periphery is always visible. Such projection also facilitates access for manual actuation of the cam 240 when desired, for a purpose set forth hereinafter. It should be noted, with reference to FIG. 5, that the dwell 246 is disposed diametrically opposite the position indicated as 0. In this position, the 0 is visible through the slot 256 at the midpoint thereof, and the cam roller 248 rests in the dwell 246, in which position the motor 222 is inactive.

The wiring and electrical circuit for the controller 66 is illustrated in FIGS. 3 and 4, and comprises two power input leads 258 and 260, which may be connected with any source of 115 volt A.C. power supply. A third conductor 262 is an output lead for power to operate external equipment (not shown) during the regeneration cycle, such as effecting resetting of a water meter after a preset gallonage, etc. The circuit includes a main or toggle switch 264, which is mounted in an opening in the door 254 and actuable from outside the housing 68 to enable an operator to close and open the circuit at will.

The circuit is schematically shown in FIG. 4, and includes points of connection of various conductors more clearly shown than in FIG. 3. As shown in FIG. 4, the circuit includes a conductor 266 that extends from one contact of the switch 264 to a contact 268 of a relay coil 270. A conductor 272 extends from the other contact 274 of the relay coil to one contact 276 of a pushbutton switch 278 mounted on the door 254 where it can be operated from the exterior of the housing 68. The other contact 280 of the pushbutton switch 278 is connected by a conductor 282 with a terminal 284 of the microswitch 252. The contacts 276 and 280 of the pushbutton switch 278 are respectively connected with conductors 286 and 288 adapted to be interconnected by a remote control switch 290 for closing the controller circuit from a remote point. The lead 260 is connected with the conductor 282 at a point 292.

The relay coil 270 contains an armature 294 that is connected with switches 296 and 298 for simultaneously operating the same. One contact 300 of the switch 296 is connected by a lead 302 with the conductor 272. The other contact 304 of the switch 296 is connected by a conductor 306 with a normally closed contact 308 of the microswitch 252. One contact 310 of the switch 298 is connected by a lead 312 with the conductor 282. The other contact 314 of the switch 298 is connected by a conductor 316 with one terminal 318 of the pilot motor 222. The conductor 262 is connected with the conductor 316 at the point 320. A lead 322 connects the conductor 262 with a normally open contact 324 of the microswitch 252. A conductor 326 connects the other terminal 328 of the motor 222 with the input lead 258 at the point 330 on the conductor 266. An indicator light 332 is connected by conductors 334 and 336 with the conductors 326 and 316, respectively, whereby said indicator light is connected in parallel with the motor 222. The indicator light 332 is supported on a bracket 338 mounted within the housing 68. A reflector 340 is mounted on the hinged door 254 so that said reflector is positioned in front of the indicator light 332 when the door 254 is closed to display a suitable color light when the motor 222 is in operation.

The motor 222 may be a low powered synchronous motor or any other type of constant speed motor having a relatively low power output. Motor 222, through the reduction gearing in the housing 224, rotates the pilot disk 140 through one complete revolution for each regeneration cycle of the water softener 6. The duration of a complete cycle of operation can vary considerably, depending upon the particular time requirements for each phase or step for a particular size of water softener unit. The motor speed and the gears in the reduction gearing may be selected to provide the desired time interval to complete the cycle in one revolution of the pilot disk 140.

In the illustrative embodiment described, the control valves 1, 1A, 2, 3, 3A and 4 are fluid pressure actuated in predetermined relation and sequence under the control of the pilot valve 70, in a manner such that the delivery of pressure fluid to the tubes and branches 78, 80, 84, 86, 88 and 92 effects closing of the valves in the conduits 62, 24, 12, 52, and 18. The release of pressure fluid from these tubes and branches allows opening of the valves aforesaid by a spring force, or by line pressure in the conduits, or by a combination of both. Pressure actuated valves of the foregoing character are conventional and well known in the art and a description thereof herein is unnecessary. It is to be understood, however, that pressure actuated valves of the type that are opened by the application of pressure fluid in the tubes and branches 78, 80, 84, 86, 88 and 92, and are closed by the exhaust of pressure fluid through such tubes and branches, may be substituted for the types of valve previously mentioned. However, in the event that the latter type of valve is used, the pressure and drain porting in the pilot disk would have to be reversed.

The present control circuit is intended to be energized manually by closing the toggle switch 264 and momentarily operating the pushbutton switch 278, or by momentarily closing the remote control switch 290 while the toggle switch 264 is closed. It is to be understood that the circuit can also be closed automatically, if desired, in response to an impulse or electrical signal from a time clock (not shown), or from a transducer (not shown) measuring a process variable, either of which can be substituted for the remote control switch 290. When once started, the motor 222 normally continues in operation until the end of the regenerating cycle which is indicated by one complete revolution of the pilot disk 140 and associated cam 240. At the end of the cycle, all of the valves are returned to their initial SERVICE position and the motor 222 is de-energized, as will be explained more fully hereinafter. The cycle can be manually interrupted at any time by opening the toggle switch 264, and can be manually controlled or accelerated, by rotating the cam 240, a portion of which projects through the slot 256 in the door 254 for that purpose. Manual operation of the cam 240 is permitted by the one-way clutch connection between the drive shaft 208 and the motor 222, described above. Controller 66 can be actuated in any one of the several ways described above to place the apparatus in operation to effect regeneration of the water softener. Assuming that the toggle switch 264 is closed, and that the pushbutton switch 278 has been moved into position to momentarily bridge the contacts 276 and 280, the relay coil 270 will be energized and the relay switches 296 and 298 closed. A circuit to initially energize the relay coil 270 is momentarily established through the power lead 258, toggle switch 264, conductor 266, to one terminal 268 of the relay coil 270, through the relay coil to the other relay terminal 274, through conductor 272, pushbutton switch 278, conductor 282 and power lead 260. The circuit to the relay coil 270 is maintained for a short interval by a holding circuit after the pushbutton switch 278 is released. The holding circuit is established up to the conductor 272 in the manner described above. From this point, current flows through the lead 302, contact 300, relay switch 296, contact 304, conductor 306, normally closed contact 308 of microswitch 252, through the common contact 284 of the microswitch 252, conductor 282 and to the other power lead 260. Thus, it will be noted that the relay coil 270 is now energized by a circuit through its own switch 296 and through the normally closed contact 308 of the microswitch 252, whereupon the pushbutton can be released.

Upon momentary actuation of the pushbutton switch 278 to energize the relay coil 270, a circuit is also completed through the motor 222, so that it immediately starts to drive the shaft 208 of the pilot valve 70.

The circuit to the motor 222 is completed as follows: With the toggle switch 264 closed, the power lead 258 is always connected in circuit with the terminal 328 of the motor 222 through the conductors 266 and 326. Upon closing of the relay switch 298, current is supplied to the other terminal 318 of the motor 222 through the power lead 260, conductors 282 and 312, contact 310, switch 298, contact 314 and conductor 316. As the motor 222 rotates, it drives the cam 240 along with the pilot shaft 208. Hence, the relay coil 270 remains energized until the cam 240 raises the roller 248 out of the dwell 246 and the arm 250 actuates the microswitch 252 to open the normally closed contact 308 to interrupt the relay holding circuit. Interruption of the holding circuit results in the opening of the switches 296 and 298 so that the motor circuit would also be interrupted except for the fact that actuation of the microswitch 252 to open the normally closed contact 308 causes simultaneous closing of the normally open contact 324, whereby current to the motor 222 is then supplied from the power lead 258 to the terminal 328 in the manner previously described. Current to the other terminal 318 of the motor 222 is then supplied through the power lead 260, conductor 282, contact 284 through the microswitch 252 to contact 324, lead 322, and the conductors 262 and 316 to continue the motor in operation for the remainder of the cycle.

Upon closing of the normally open (N.O.) contact 324 of the microswitch 252, current supply to the conductor 262 can be used to actuate the water meter reset motor (not shown) or any other equipment which it is desired to maintain in operation during a regenerating cycle.

The design of the cam 240 is such that it permits the relay coil 270 to be energized for a few minutes at the start of the cycle. The coil does not remain energized throughout the complete cycle but only for the brief interval during which the roller 248 is being raised out of the dwell 246 in the cam 240. The time required for such movement and the resulting de-energizing of the relay coil 270 will vary slightly, depending on the speed of the motor 222. The relay coil 270, having initiated the starting of the motor 222, is no longer required, and is de-energized, resulting in a saving of electric current and adding to the effective life of the relay.

The cam roller 248 follows the periphery of the cam 240 and maintains the circuit to the motor 222. Operation of the motor 222 continues until the cam 240 and the pilot disk 140 have completed a full revolution, whereupon the cam roller 248 drops into the dwell 246, thereby breaking the circuit through the microswitch 252 and interrupting the circuit to the motor 222. Simultaneously with the opening of the motor circuit at the microswitch, contact 324 is opened and the switch contact 308 is closed, ready for the initiation of a new cycle, but since the circuit is open at this time, a new cycle will be not started.

FIG. 4 illustrates the components of the electric circuit in their inactive position, wherein the switches 264, 278 and 290 are open, the motor 222 is de-energized, and the cam follower 248 of the microswitch 252 rests in the dwell 246. At such time, the numeral "0" on the cam 240 would be visible at the middle of the slot 256 in the control cabinet door 254. The "0" position of the pilot disk 140 corresponds to the SERVICE operation of the water softener, as indicated in FIG. 2, at which time the supply valve 2 and service valve 4 are open and all other valves are closed.

FIGS. 11, 12, 13, 14 and 15 are schematic views illustrating the positions of the ports in the pilot disk 140 relative to the passages in the base 96 corresponding to the "0" to "4" positions of the pilot disk 140 and effecting the operations indicated in FIG. 2. The passages 132, 134, 136 and 138 in the base 96, as appearing in FIGS. 11 to 15, inclusive, are shown smaller than the ports 156, 158, 160, 162, 164, 166, 168, 170, 182, 184, 186, 188 and 190 in the pilot disk 140 to facilitate illustration of the registering ports and passages thereof. It will be understood that the ports and passages in the pilot valve disk 140 and base 96 may have any desired diameter consistent with the principles of the present invention.

FIG. 11 illustrates the pilot disk 140 in the SERVICE position corresponding to a normal water softening operation, the numeral "0" on the cam 240 at such time being visible at the middle of the slot 250 in the door 254 of the housing 68 (FIG. 1), and in which cam position the motor 222 is inactive. Pressure fluid in the chamber 100 acts through the registering port 170 and passage 132, tube 78 and branch tube 80 to maintain the drain valve 1 and the by-pass valve 1A closed. Pressure fluid is also effective through the ports 156, 158 and 160, which register with the passage 136 by way of the channel 192, tube 86 and branch tube 88 to maintain the backwash valve 3 and waste valve 3A closed. The tubes 84 and 92 are open to exhaust by communication with the drain port 130 in the base 96 and axial port 172 in the pilot disk 140. Tube 84 connects with the axial port 172 by way of passage 134, port 184 and radial passage 174, and tube 92 connects the axial port 172 by way of passage 138, port 188 and radial passage 178, to relieve the pressure and to permit the supply valve 2 and service valve 4 to open.

It will be seen from FIG. 1 that, with the valves in the positions specified, raw water enters the inlet 8 through supply conduit 12, valve 2, pipe-T 14 and pipe nipple 16, and flows through the softener tank 6, outlet 10, pipe nipple 22, pipe-T 20, service conduit 18 and valve 4 to the point of use. When the motor 222 is started, the pilot disk 140 slowly rotates in a clockwise direction, as indicated by the arrow in FIG. 12, and as it approaches the number 1 or "OFF" position, pressure fluid is effective: through the port 166 and passage 138, to close the service valve 4; through the ports 168 and 170, channel 198 and passage 132, to retain the drain valve 1 and by-pass valve 1A closed, through the port 160 and passage 134, to close the supply valve 2; and through the port 156 and passage 136, to retain the backwash valve 3 and waste valve 3A closed. It should be observed that the valves 1, 1A, 3 and 3A, which had previously been closed, remain in that position during movement of the valve from the number "0" position shown in FIG. 11 to the number "1" position shown in FIG. 12. Such condition is possible because of the interconnecting channels 192 and 198. Moreover, the service valve 4, which was previously open, is closed shortly after the closing of the supply valve 2 because of the relative spacing of the ports in the pilot disk 140 and the passages in the seat 108.

Figure 13:
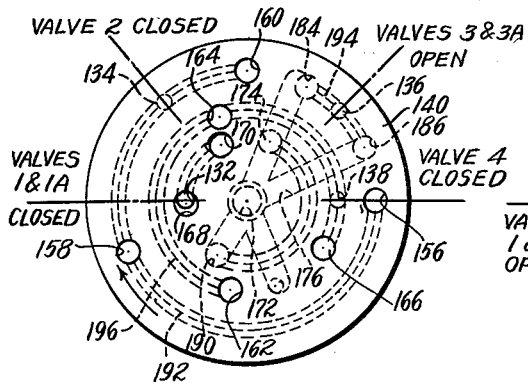

Continued rotation of the valve disk 140 to the number 2 position, shown in FIG. 13, bring the seat passage 136 into register with the radial exhaust passages 174 and 176 by way of vertical ports 184, 186 and channel 194, permitting the draining of spent operating fluid from the tube 86 and branch tube 88, allowing the waste valve 3A and backwash valve 3 to open. The remaining valves are retained closed by continued connection with the pressure chamber 100 afforded by registration of ports 156, 158, 160 and channel 192 with the passage 134, ports 162, 164, 166, channel 196 and passage 138, and port 168 and passage 132. This position of the pilot disk 140 represents the "backwash" or reverse flow phase in which raw water passes from the supply conduit 12 into backwash conduit 56 through the backwash valve 3, fitting 60, conduit 18, pipe-T 20, pipe nipple 22, outlet 10, water softener tank 6, inlet 8, pipe nipple 16, conduit 24, pipe-T 54, and waste valve 3A and conduit 52 to waste. Such reverse flow flushes the filtrate out of the zeolite bed in the water softener tank 6 to waste through the conduit 52.

Figure 14:
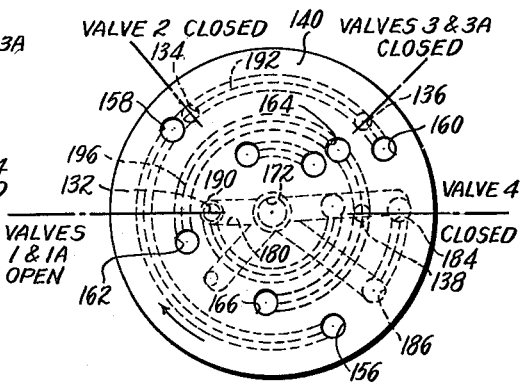

In the No. 3 position, shown in FIG. 14, the pilot disk has advanced approximately 54° clockwise from the position shown in FIG. 13, in which position the pressure fluid connections are as follows: passage 132 communicates with port 190, radial passage 180, axial port 172, and drain port 130 to relieve the fluid pressure in the tube 78 and branch 80 to open the drain valve 1 and by-pass valve 1A; ports 156, 158 and 160 continue to communicate with the passage 134 by way of channel 192 to apply fluid pressure through tube 84 to maintain the supply valve 2 closed; ports 156, 158 and 160 also act, by way of channel 192, passage 136, tube 86 and branch 88, to close the backwash valve 3 and waste valve 3A; and the ports 162, 164 and 166 are effective by way of channel 196, passage 138 and tube 92 to maintain the service valve 4 closed. As will be seen from FIGS. 13 and 14, clockwise movement of the pilot disk 140 produced the following sequence of operations: the port 168 (FIG. 13) moved out of register with the passage 132, thereby trapping fluid under pressure within the tube 78 and branch 80 to maintain the valves 1 and 1A closed until the passage 132 registered with the port 190 and radial passage 180 (FIG. 14) to drain the trapped fluid and to allow the valves 1 and 1A to open. In the meantime, passage 136 moved out of register with the ports 184, 186 and channel 194 into register with the port 160 and channel 192, to permit pressure fluid to close the backwash valve 3 and waste valve 3A.

With the valves 1 and 1A open and all of the other valves closed, raw water flows from supply conduit 12, pipe-T 26, conduit 24, open by-pass valve 1A, ejector 28, pipe-T 14, nipple 16, inlet 8, water softener tank 6, outlet 10, nipple 22, pipe-T 20, drain conduit 62, open drain valve 1, pipe-T 64 and waste conduit 52. The flow through the ejector 28 produces a low pressure therein, and in the brine supply conduit 30, which is effective to open the valve 42 and create a flow of brine from the tank 32, which is mixed with the raw water in the ejector 28 and flows through the bed of zeolite in the softener tank 6 to regenerate the zeolite. As is indicated in FIG. 5, the brine and slow rinse step "3" extends well over half the cycle. Before the end of step "3," the supply of brine in the tank 32 is exhausted, and the float 46 connects the pressure chamber in the valve 42 to atmosphere, which pressure is sufficient, in view of the low pressure caused by the ejector 28, to close the valve 42. Raw water continues to flow through the by-pass conduit 24 to effect a slow rinsing of the zeolite bed. Step "3" is therefore termed a "brine and slow rinse step."

Figure 15:
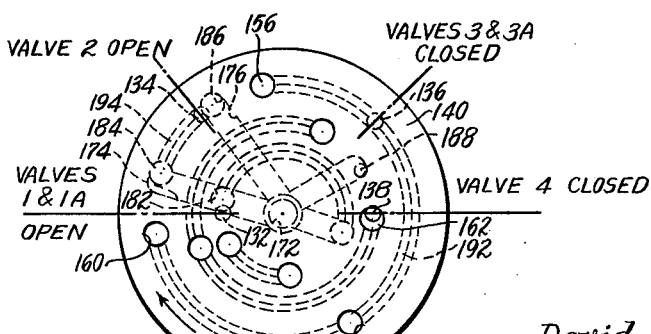

Continued clockwise rotation of the pilot disk 140 to the position shown in FIG. 15 results in the following operating fluid connections being established: passage 132 still communicates with the drain through port 182, which is about to move from registering relation therewith, maintaining the drain valve 1 and by-pass valve 1A open; passage 134 communicates with the ports 184 and 186 by way of channel 194, radial passages 174 and 176, and axial port 172 to drain fluid from the tube 84 permitting valve 2 to open; passage 136 communicates with ports 156, 158 and 160 by channel 192 to maintain the valves 3 and 3A closed; and passage 138 communicates with the port 162 to retain the valve 4 closed. In this position of the pilot disk 140, raw water is permitted to flow by way of supply conduit 12, open supply valve 2, pipe-T 14 and nipple 16, as well as by way of by-pass conduit 24, open by-pass valve 1A, to the inlet 8 of the water softener tank, through the bed of zeolite, and out by way of outlet 10, nipple 22, pipe-T 20, drain conduit 62, open drain valve 1, pipe-T 64 and waste conduit 52. The simultaneous delivery of raw water to the softener tank 6 through the conduits 12 and 24, which are disposed in parallel relation, effects a rapid rinse of the brine from the zeolite bed.

Continued clockwise rotation of the pilot disk 140 completes one revolution, returning the disk to the position shown in FIG. 11. Ports 170 then registers with passage 132 to close the drain valve 1 and by-pass valve 1A; port 188 registers with passage 138 to open the service valve 4, while the supply valve 2 remains open and the backwash valve 3 and waste valve 3A remain closed. The roller 248 drops into the cam dwell 246 to de-energize the motor 222, completing the regenerating cycle.

With reference to FIG. 1, it will be observed that the supply conduit 12 and the by-pass conduit 24 join downstream of the by-pass valve 1A, so that, when the by-pass valve 1A is closed, the raw water in the supply conduit 12 fills the downstream end of the by-pass conduit 24 to the closed by-pass valve 1A, and flows through the brine supply conduit 30 and to the valve 42. The pressure of the water in the conduit 30 is sufficient to overcome atmospheric pressure which held it closed, and to open the valve 42. Raw water flows into the brine tank 32, raising the level therein until a predetermined level is reached, whereupon the float 46 operates the pilot valve 44 to connect the pressure chamber in the valve with the pressure in the conduit 30 to positively close the valve 42, all as is described fully in Patent 2,243,815.

The arcuate channels 192, 194, 196, 198 and 200, in addition to assuring the continuous opened and closed positions of the valves 1, 1A, 2, 3, 3A and 4, described above, afford pressure chambers in which the pressure fluid acts upwardly in opposition to the pressure of the fluid in the pressure chamber 100, to counterbalance, to some degree, the fluid pressure forcing the pilot disk 140 against the valve seat 108, and decreasing, to some degree, the frictional resistance offered to the rotation of the pilot disk on its seat.

The one-way clutch between the motor 222 and the cam 240 permits manual actuation of the cam 240 and the pilot disk 140 in one direction at any time. Regardless of whether the motor 222 is in operation, the cam 240 can be manually turned to any desired position. If the motor circuit is open, the cam 240 can be left in any given position so long as desired, or the entire cycle can be manually controlled. Similarly, with the motor 222 in operation, the various steps or phases of the cycle can be advanced by manual turning of the cam 240.

While the above operation is described in connection with a water softener device, it is evident that the principles of the present invention can be employed to design a controller to operate any other cyclically actuated device.

Having fully described the invention, it is to be understood that various changes may be made therein without departing from the principles of the invention or from the scope of the annexed claims.

I claim:

1. A water softener system, comprising: a tank containing a bed of zeolite or similar water softener material, said tank having an inlet and an outlet; a supply conduit for a liquid to be treated connected with said inlet; a supply valve connected in said supply conduit controlling the flow of liquid to said inlet; a service conduit for treated liquid connected with said outlet; a service flow control valve connected in said service conduit; a waste conduit connected with said inlet; a waste valve connected in said waste conduit; a backwash conduit connected at one end thereof with said supply conduit upstream of said supply control valve and connected at its opposite end with said outlet; a backwash valve connected in said backwash conduit upstream of the point of connection of said backwash conduit with said outlet; a drain conduit connected at one end with said outlet, said drain conduit being connected at its other end with said waste conduit downstream of said waste valve; a drain valve connected in said drain conduit upstream of its point of connection with said waste conduit; a by-pass conduit connected at one end with the tank inlet and at the other end with said supply conduit upstream of the supply valve; a by-pass valve connected in said by-pass conduit; a regenerating fluid conduit connected at one end with said by-pass conduit at a point between said by-pass valve and said tank inlet, and connected, at the other end, with a supply of regenerating fluid; a regenerating fluid supply valve connected in said regenerating fluid conduit; means controlling said regenerating fluid supply valve during a regenerating cycle to supply a predetermined quantity of regenerating fluid through said regenerating fluid conduit and thereafter to close said valve; and control means operating said supply valve, service flow control valve, waste valve, backwash valve, drain valve, and by-pass valve in accordance with a predetermined program schedule to effect, in sequence, service, backwashing, regeneration, slow rinse and fast rinse of the water softener material in said tank, said control means being constructed and arranged to maintain said by-pass valve and said drain valve continuously open, and said supply valve, said service flow control valve, said waste valve and said backwash valve continuously closed, during regeneration and subsequent slow rinse of the water softener material in said tank, said regenerating fluid supply valve being constructed and arranged to be open at the beginning of regeneration when said by-pass valve and said drain valve are opened by said control means, and being constructed and arranged to be closed by said means controlling said regenerating fluid supply valve at the end of regeneration and before slow rinse begins, and while said by-pass and said drain valves remain open.

2. A water softener system as defined in claim 1, including an ejector in said by-pass conduit downstream of said by-pass valve, said regenerating fluid conduit being connected with said by pass conduit at said ejector.

3. A water softener system as defined in claim 1, in which the valves are operated in the following sequence: (1) the supply valve and service flow control valve are opened and the drain valve, by-pass valve, backwash valve and waste valve are closed; (2) the supply valve and service flow control valve are closed and the other valves remain closed; (3) the backwash valve and waste valve are opened and the supply valve, service flow control valve, by-pass valve and drain valve remain closed; (4) the drain valve and the by-pass valve are opened, the backwash valve and waste valve are closed, and the supply valve and the service flow control valve remain closed; (5) the drain valve and the by-pass valve remain open, the supply valve is opened, and the backwash valve, the waste valve and the service flow control valve remain closed; and (6) the drain valve and the by-pass valve are closed, the supply valve remains opened, the backwash valve and the waste valve remain closed, and the service flow control valve is opened.

4. A water softener system as defined in claim 1, in which the drain valve, the by-pass valve, the supply valve, the backwash valve, the waste valve, the service flow control valve, are fluid pressure actuated, and in which the control means for the valves includes a pilot valve and operating pressure-fluid connections between the pilot valve and the fluid pressure actuated valves.

5. A water softener system as defined in claim 4, in which the operating pressure fluid connections between the pilot valve and the drain valve and the by-pass valve have a common connection with the pilot valve for concurrent operation of said drain valve and said by-pass valve, and the operating pressure fluid connections between the pilot valve and the backwash valve and the waste valve have a common connection with the waste valve for concurrent operation of said backwash valve and said waste valve.

6. A water softener system as defined in claim 4, in which the pilot valve has a rotary disk and a valve seat, the valve seat having a central passage connected with a drain and a plurality of other passages, arranged on concentric circles and communicating with said operating pressure-fluid connections, the rotary disk comprising a lower surface seated on the valve seat, said disk including a plurality of pressure ports passing therethrough and disposed on concentric circles having the same radii as the circles of said other passages in the valve seat and cooperating therewith, and a plurality of radial exhaust passages connected at one end with a central axial port having an open end on the seating face of the disk and communicating with the central passage in the valve seat, the outer end portion of each radial passage communicating with an axial extending port having an open end on the seating face of the disk and lying on one of said concentric circles.

7. A water softener system as defined in claim 6, in which said backwash valve and said waste valve have a common connection with one of said passages in the valve seat.

8. A water softener system as defined in claim 6, in which said drain valve and said by-pass valve have a common connection with one of said passages in the valve seat.

9. A water softener system as defined in claim 6, in which the pressure ports in the disk are disposed on three concentric circles and wherein the disk has arcuate grooves in its lower surface interconnecting the ports lying on the respective circles; a housing having a pressure chamber for operating fluid surrounding the disk; and means for admitting pressure fluid into said chamber, whereby pressure fluid within said chamber is effective to act through any of the pressure ports on any circle to exert pressure in valve seat passage having communication with a port on that circle.

10. A water softener system as defined in claim 9, wherein each of the arcuate grooves extends through an angle less than 360°.

11. A water softener system as defined in claim 9, wherein the disk has two arcuate grooves lying on one of the circles, and wherein one of said arcuate grooves interconnects certain exhaust ports in said disk and the other of the arcuate grooves interconnects certain exhaust ports in said disk.

12. A water softener system as defined in claim 9, in which the pilot disk has pressure ports interconnected by the concentric grooves and in which the pressure ports lying on one groove are radially staggered in relation to the ports lying on the other groove.

13. A water softener system as defined in claim 9, in which each of the arcuate grooves extends through an angle of less than 360°, and in which a first concentric groove on a first circle interconnects three pressure ports and a second groove on said first circle interconnects two exhaust ports, a concentric groove on a second circle interconnects three pressure ports, a first groove on a third circle interconnects two pressure ports and a second groove on said third circle interconnects two exhaust ports.

References Cited by the Examiner
UNITED STATES PATENTS

| | | | |
|---|---|---|---|
| 1,211,735 | 1/17 | Magrath | 210—190 |
| 1,611,422 | 12/26 | Duden | 23—112 |
| 1,792,220 | 2/31 | Green | 23—112 |
| 2,076,321 | 4/37 | Pick | 210—275 X |
| 2,098,893 | 11/37 | Staegemann | 210—277 X |
| 2,209,989 | 8/40 | McCann | 137—625.29 |
| 2,243,815 | 5/41 | Griswold | 210—278 X |
| 2,309,032 | 1/43 | Zimmerman | 210—278 X |
| 2,564,529 | 8/51 | Griswold | 137—625.21 |
| 2,630,325 | 3/53 | Reyonlds | 137—625.29 |
| 2,680,735 | 6/54 | Carlsson et al. | 210—190 |
| 2,722,514 | 11/55 | Sloan | 210—134 |
| 2,875,428 | 2/59 | Griswold | 137—624.16 |
| 2,986,167 | 5/61 | Griswold et al. | 137—625.21 X |
| 3,044,626 | 7/62 | Rose | 210—140 X |
| 3,080,975 | 3/63 | Rose | 210—140 X |

REUBEN FRIEDMAN, *Primary Examiner.*

HARRY B. THORNTON, HERBERT L. MARTIN, MAURICE A. BRINDISI, *Examiners.*

UNITED STATES PATENT OFFICE
CERTIFICATE OF CORRECTION

Patent No. 3,190,446

June 22, 1965

David E. Griswold

It is hereby certified that error appears in the above numbered patent requiring correction and that the said Letters Patent should read as corrected below.

Column 2, line 62, for "take" read -- takes --; column 3, line 74, for "pipe-T" read -- pipe-T 74 --; column 6, lines 6 to 8, strike out "that the third arcuate channel 194 extends through an angle of aproximately 45;"; column 7, line 61, for "62, 24, 12, 52," read -- 62, 24, 12, 56, 52, --; column 13, line 41, before "valve", first occurrence, insert -- pilot --; column 14, line 14, before "valve" insert -- a --.

Signed and sealed this 19th day of April 1966.

(SEAL)
Attest:

ERNEST W. SWIDER
Attesting Officer

EDWARD J. BRENNER
Commissioner of Patents